United States Patent
Woodworth

(10) Patent No.: US 11,673,456 B2
(45) Date of Patent: Jun. 13, 2023

(54) CONVERTIBLE VEHICLE DOOR EMERGENCY REMOVAL DEVICE

(71) Applicant: Helen Woodworth, South Ryegate, VT (US)

(72) Inventor: Helen Woodworth, South Ryegate, VT (US)

(*) Notice: Subject to any disclaimer, the term of this patent is extended or adjusted under 35 U.S.C. 154(b) by 240 days.

(21) Appl. No.: 16/880,994

(22) Filed: May 22, 2020

(65) Prior Publication Data

US 2021/0362569 A1   Nov. 25, 2021

(51) Int. Cl.
*B60J 5/04* (2006.01)
*A61G 1/048* (2006.01)
*A61G 1/044* (2006.01)
*A61G 1/013* (2006.01)

(52) U.S. Cl.
CPC ............ *B60J 5/0476* (2013.01); *A61G 1/013* (2013.01); *A61G 1/044* (2013.01); *A61G 1/048* (2013.01); *B60J 5/0486* (2013.01)

(58) Field of Classification Search
CPC ....... B60J 5/0476; B60J 5/0486; A61G 1/103; A61G 1/044; A61G 1/048
See application file for complete search history.

(56) References Cited

U.S. PATENT DOCUMENTS 7,188,846 B2 * 3/2007 Deavila .................... A47K 1/02
                                                     280/30

* cited by examiner

*Primary Examiner* — Robert G Santos
*Assistant Examiner* — Adam C Ortiz
(74) *Attorney, Agent, or Firm* — Kimberly McLean Esq.; McLean Law LLC

(57) ABSTRACT

A convertible vehicle door emergency removal device comprising a pair of door members, a stretcher frame member and a pad member. The door members each include a first door member and a second door member and each door member is removably attached to a corresponding vehicle door frame for opening and closing. Each door member includes a pair of mating hinges for attachment to one another and a pair of strap handles for transporting a stretcher frame member. The stretcher frame member is formed by attaching the pair of door members to one another after each door member is removed from a corresponding door frame. The pair of door members are attached to one another by connecting the mating hinges to one another. The stretcher frame member is configured to receive an occupant for transporting. The pad member overlays a top surface of the stretcher frame member. Moreover, the pad member is inflatable and includes an inflatable cushion for providing cushion support to an injured region of the occupant.

5 Claims, 3 Drawing Sheets

CONVERTIBLE VEHICLE DOOR EMERGENCY REMOVAL DEVICE

FIELD OF THE INVENTION

Embodiments described herein generally relate to emergency removal devices, and more particularly to a convertible vehicle door emergency removal device.

BACKGROUND OF THE INVENTION

Driving an all-terrain vehicle ("ATV") is a major component of recreation in the United States. However, this hobby may be dangerous as most of the physical body is exposed to the elements when operating these vehicles. In the event that a person crashes or falls, injuries could be serious and sometimes fatal. Hence, an efficient way of transferring persons to safety in the event that they are harmed while operating these vehicles is desirable.

BRIEF DESCRIPTION OF THE DRAWINGS

The various advantages of the embodiments of the present disclosure will become apparent to one skilled in the art by reading the following specification and appended claims, and by referencing the following drawing(s), in which:

SUMMARY OF THE INVENTION

Exemplary embodiments disclosed herein describe a convertible vehicle door emergency removal device. The device includes a pair of door members, a stretcher frame member and a pad member. The door members each include a first door member and a second door member and each door member is removably attached to a corresponding vehicle door frame for opening and closing. Each door member includes a pair of mating hinges for attachment to one another and a pair of strap handles for transporting a stretcher frame member. The stretcher frame member is formed by attaching the pair of door members to one another after each door member is removed from a corresponding door frame of the vehicle. The pair of door members are attached to one another by connecting the mating hinges to one another. The stretcher frame member is configured to receive an occupant for transporting. The pad member overlays a top surface of the stretcher frame member. Moreover, the pad member is inflatable and includes an inflatable cushion for providing cushion support to an injured region of the occupant.

In some exemplary embodiments, the first door member includes a buckled strap for securing an occupant to the stretcher frame member.

In some exemplary embodiments, each strap handle in each pair is located at opposite sides of a corresponding door member.

In some exemplary embodiments, the strap handles provide for ease of lifting and carrying the occupant of the stretcher frame member.

In some exemplary embodiments, the vehicle is an all-terrain vehicle.

DETAILED DESCRIPTION

Figure 1:
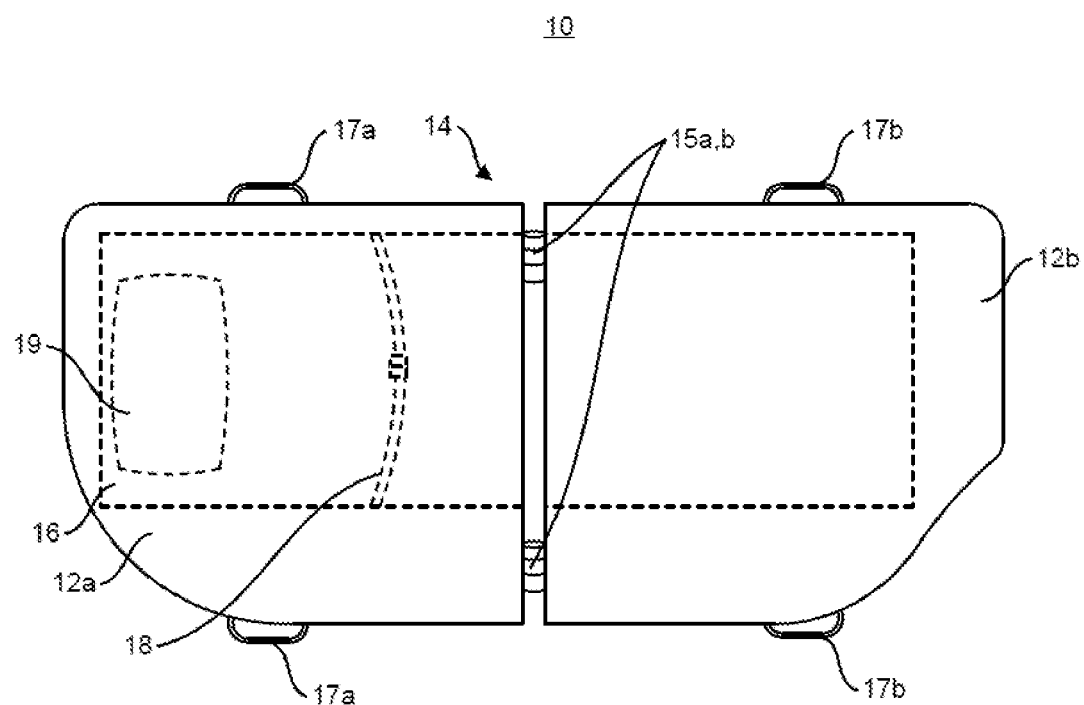
FIG. 1 shows an exemplary view of a convertible vehicle door emergency removal device according to an embodiment of the present disclosure.

The present disclosure relates to a convertible vehicle door emergency removal device ("the device"). The doors of a vehicle are removable from the vehicle and may be converted to a transport device by connecting the doors to one another. The transport device allows persons to be carried in a safe manner after being wounded on an all-terrain vehicle ("ATV"). The surface and sturdiness provided by the doors allow persons to easily carry an injured adult. As illustrated in FIG. 1, the device 10 includes a pair of door members 12a, 12b, a stretcher frame member 14 and a pad member 16. Although the exemplary embodiments are disclosed for an all-terrain vehicle, any vehicle may alternatively be used for the device.

Figure 2:
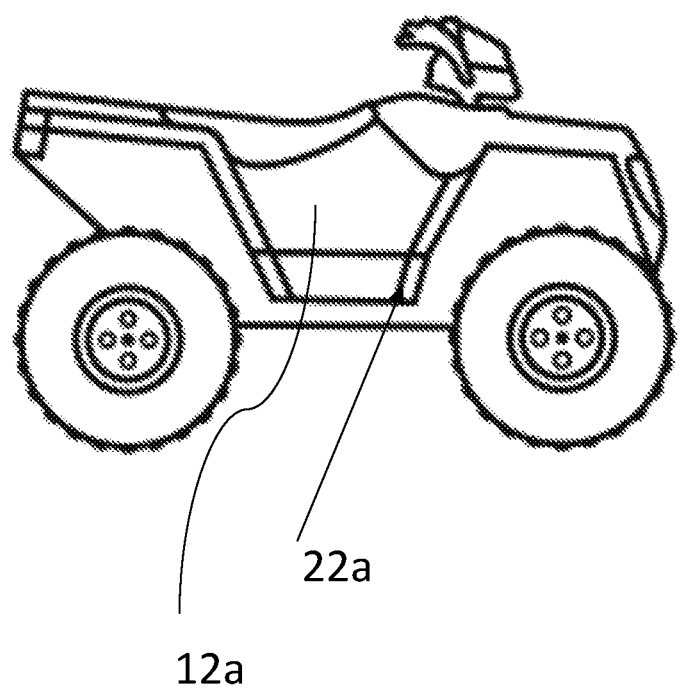
FIG. 2 shows an exemplary view of a first door member attached to a corresponding door frame of a vehicle according to an embodiment of the present disclosure.
Figure 3:
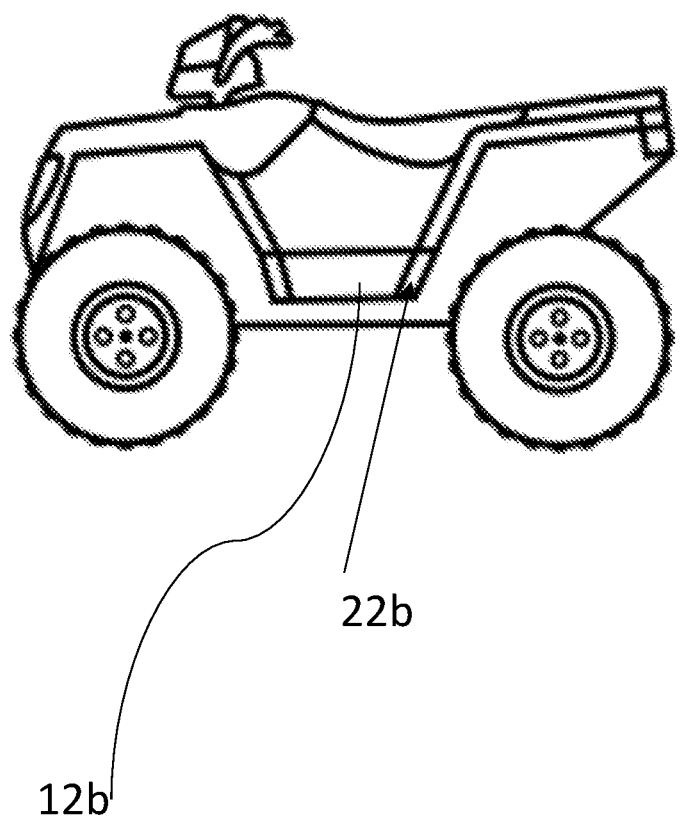
FIG. 3 shows an exemplary view of a second door member attached to a corresponding door frame of a vehicle according to an embodiment of the present disclosure.

The pair of door members each include a first door member 12a and a second door member 12b. Both door members may be attachments to a door frame 22a and 22b of a vehicle respectively, such as, for example, an all-terrain vehicle (ATV), as shown in FIGS. 2-3. The door members are removably attached to the corresponding vehicle door frame for opening and closing the door to allow entry and exit to and from the interior of the vehicle. The door members may be made from any sturdy material, such as, for example, metal (e.g., aluminum). Each door member 12a, 12b includes a pair of mating hinges 15a, 15b for attachment to one another. Any suitable hinge mechanism (i.e., mechanical bearing) may be used for attaching the first door member 12a and the second door member 12b.

Moreover, each door member 12a, 12b includes a pair of strap handles 17a, 17b for transporting the stretcher frame member 14. Each strap handle in a pair is positioned at an opposite side of a corresponding door member. The strap handles provide for ease of lifting and carrying the occupant of the stretcher frame member. A plurality of individuals may grab a respective strap handle on each side of the stretcher frame member to collectively lift the stretcher frame member 14 and carry/transport the occupant of the stretcher frame member 14. The strap handles may be made from any suitable strong material. Further, at least one of the door members include a buckled strap 18 for securing an occupant to the stretcher frame member 14. In a preferred embodiment, the first door member 12 includes the buckled strap 18.

The stretcher frame member 14 is formed by attaching the pair of door members 12a, 12b to one another after each door member is removed from a corresponding door frame of a vehicle. The pair of door members are attached to one another by connecting the respective mating hinges 15a and 15b to one another. The stretcher frame member is configured to receive an occupant for transporting.

The pad member 16 overlays a top surface of the stretcher frame member 14. The pad member is inflatable and includes an inflatable cushion 19 for providing cushion support to an injured region of the occupant, such as, for example, the occupant's head. The inflatable cushion may reduce intracranial pressure from a head trauma. The pad member provides comfort to the occupant of the stretcher frame member 14. The pad member may be made from any suitable material and may be inflatable upon the insertion of air. The inflatable cushion may be made from any suitable material and maybe inflatable by the insertion of air.

Moreover, it should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A convertible vehicle door emergency removal device comprising:
    a pair of door members including a first door member and a second door member, each door member is removably attached to a corresponding vehicle door frame for opening and closing and each door member includes a pair of mating hinges for attachment to one another and a pair of strap handles for transporting a stretcher frame member;
    a stretcher frame member formed by attaching the pair of door members to one another after each door member is removed from the corresponding door frame of the vehicle, the pair of door members are attached to one another by connecting the mating hinges to one another, and wherein the stretcher frame member is configured to receive an occupant for transporting; and
    a pad member overlaying a top surface of the stretcher frame member, the pad member is inflatable and includes an inflatable cushion for providing cushion support to an injured region of the occupant.

2. The device of claim 1, wherein the first door member includes a buckled strap for securing an occupant to the stretcher frame member.

3. The device of claim 1, wherein each strap handle in each pair is located at opposite sides of a corresponding door member.

4. The device of claim 1, wherein the strap handles provide for ease of lifting and carrying the occupant of the stretcher frame member.

5. The device of claim of 1, wherein the vehicle is an all-terrain vehicle.

* * * * *